US009797766B2

(12) United States Patent
Wittenberg et al.

(10) Patent No.: US 9,797,766 B2
(45) Date of Patent: *Oct. 24, 2017

(54) APPLICATION FOR AND METHOD OF PREVENTING OVERHANGING WEIGHING PLATTER OF SCALE FROM TIPPING AT PRODUCT CHECKOUT SYSTEM AND METHOD OF MOUNTING AND REMOVING THE WEIGHING PLATTER WITHOUT TOOLS (71) Applicant: SYMBOL TECHNOLOGIES, INC., Lincolnshire, IL (US)

(72) Inventors: Carl D. Wittenberg, Water Mill, NY (US); John E. Wilson, Acacia Gardens (AU)

(73) Assignee: Symbol Technologies, LLC, Holtsville, NY (US)

( * ) Notice: Subject to any disclaimer, the term of this patent is extended or adjusted under 35 U.S.C. 154(b) by 162 days.

This patent is subject to a terminal disclaimer.

(21) Appl. No.: 14/665,399

(22) Filed: Mar. 23, 2015

(65) Prior Publication Data

US 2015/0192455 A1    Jul. 9, 2015

Related U.S. Application Data (63) Continuation of application No. 13/629,909, filed on Sep. 28, 2012, now Pat. No. 9,018,545.

(51) Int. Cl.
*G01G 19/414* (2006.01)
*G07G 1/12* (2006.01)
(Continued)

(52) U.S. Cl.
CPC .......... *G01G 19/40* (2013.01); *G01G 19/4144* (2013.01); *G01G 19/52* (2013.01); *G07G 1/0072* (2013.01); *Y10T 29/49826* (2015.01)

(58) Field of Classification Search
CPC .... G01G 19/40; G01G 19/4144; G01G 19/52; G07G 1/0072; Y10T 29/49826
See application file for complete search history.

(56) References Cited

U.S. PATENT DOCUMENTS

| 4,582,151 A | 4/1986 | Mairot et al. |
| 4,986,376 A * | 1/1991 | Cone ...................... G01G 21/23 177/128 |

(Continued)

FOREIGN PATENT DOCUMENTS

| CN | 1229190 A | 9/1999 |
| EP | 0534641 | 3/1993 |
| WO | 2014052235 A1 | 4/2014 |

OTHER PUBLICATIONS

International Searching Authority, "International Search Report and Written Opinion of the International Search Authority," mailed in connection with International Patent Application No. PCT/US2013/061176 dated Jan. 8, 2014 (9 pages).

(Continued)

*Primary Examiner* — Randy Gibson
(74) *Attorney, Agent, or Firm* — Yuri Astvatsaturov (57) ABSTRACT

A checkout system includes a workstation having a data capture arrangement for capturing through a horizontal window a target associated with a product to identify the product being checked out at the workstation, and a scale for weighing the product at the workstation. The scale has a scale mechanism, and a weighing platter on which the product is placed for weighing. The weighing platter is integrated with the horizontal window and overlies the scale mechanism. The weighing platter projects past the scale mechanism and has a front end that overhangs the scale mechanism. Non-threaded, interlocking connectors, which are provided on the weighing platter and the scale mechanism, prevent the weighing platter from tipping if a force is (Continued)

exerted on the front end of the weighing platter. The weighing platter is mounted on, and removed from, the scale mechanism without the aid of tools.

7 Claims, 8 Drawing Sheets (51) Int. Cl.
    *G01G 19/40*     (2006.01)
    *G07G 1/00*     (2006.01)
    *G01G 19/52*     (2006.01)

(56) References Cited

U.S. PATENT DOCUMENTS

| | | | |
|---|---|---|---|
| 5,033,562 A | 7/1991 | Cone | |
| 5,086,879 A | 2/1992 | Latimer et al. | |
| 5,152,355 A | 10/1992 | Copus | |
| 5,254,812 A | 10/1993 | Hilford | |
| 5,376,761 A | 12/1994 | Koch et al. | |
| 5,834,708 A | 11/1998 | Svetal et al. | |
| 6,211,472 B1 * | 4/2001 | Schulze | G01G 21/244 177/154 |
| 6,557,391 B2 | 5/2003 | Luchinger | |
| 6,835,901 B2 | 12/2004 | Luchinger | |
| 7,012,198 B2 | 3/2006 | Ludi et al. | |
| RE40,071 E * | 2/2008 | Svetal | G01G 19/4144 177/180 |
| 7,681,795 B2 | 3/2010 | Roquemore | |
| 8,113,431 B2 | 2/2012 | Gegerson | |
| 8,579,199 B2 | 11/2013 | Sano | |
| 9,018,545 B2 * | 4/2015 | Wittenberg | G01G 19/4144 177/126 |
| 2002/0005301 A1 | 1/2002 | Rehm | |
| 2006/0038009 A1 | 2/2006 | Russell et al. | |
| 2010/0139989 A1 | 6/2010 | Atwater et al. | |
| 2011/0232972 A1 | 9/2011 | McQueen et al. | |
| 2012/0038480 A1 | 2/2012 | Friend et al. | |
| 2013/0291300 A1 | 11/2013 | Bly et al. | |

OTHER PUBLICATIONS

The State Intellectual Property Office of the People's Republic of China, "First Office Action," mailed in connection with Chinese Patent Application No. 201380050781.9 dated Apr. 29, 2016 (20 pages).

The State Intellectual Property Office of the People's Republic of China, "Second Office Action," mailed in connection with Chinese Patent Application No. 201380050781.9 dated Dec. 20, 2016 (12 pages).

Office Action for European Patent Application No. 13774303.5 dated Feb. 1, 2017.

* cited by examiner

APPLICATION FOR AND METHOD OF PREVENTING OVERHANGING WEIGHING PLATTER OF SCALE FROM TIPPING AT PRODUCT CHECKOUT SYSTEM AND METHOD OF MOUNTING AND REMOVING THE WEIGHING PLATTER WITHOUT TOOLS

RELATED APPLICATIONS

This is a continuation application of U.S. patent application Ser. No. 13/629,909, filed. Sep. 28, 2012.

FIELD OF THE DISCLOSURE

The present disclosure relates generally to a point-of-transaction checkout system having a workstation through which products bearing electro-optically readable targets are passed by a user, and, more particularly, to an arrangement for, and a method of, preventing an overhanging weighing platter of a scale at the workstation from tipping during product weighing, and, still more particularly, to a method of mounting the weighing platter on, and of removing the weighing platter from, the scale, without the aid of tools.

BACKGROUND

In the retail industry, flat bed or horizontal slot scanners, each having a single horizontal window; vertical slot scanners, each having a single upright or vertical window; and bi-optical scanners, each having both a horizontal window and an upright window, have been used to electro-optically read targets, such as one-dimensional bar code symbols, particularly of the Universal Product Code (UPC) type, and two-dimensional bar code symbols, such as PDF417 and QR codes, at full-service, point-of-transaction checkout systems operated by checkout clerks, and/or at self-service, point-of-transaction checkout systems operated by customers, in supermarkets, warehouse clubs, department stores, and other kinds of retailers, for many years. Products to be purchased bear, or are associated with, identifying target symbols and are typically slid by a user across a scanner window, e.g., from right to left, or from left to right, in a "swipe" mode, to a bagging area. Alternatively, the user merely presents the target symbol on, or associated with, the product to, and holds the product momentarily steady at, a central region of a scanner window in a "presentation" mode, prior to placing the product in the bagging area. The choice depends on the type of target, on user preference, and on the layout of the system.

Some checkout systems are laser-based workstations, and project a multitude of laser scan lines through a scanner window. When at least one of the scan lines sweeps over a target symbol associated with a product, the symbol is processed, decoded and read, thereby identifying the product and enabling information, such as the product's price, to be retrieved from a price database. The multitude of scan lines is typically generated by a scan pattern generator which includes a laser for emitting a laser beam at a mirrored component mounted on a shaft for rotation by a motor about an axis. A plurality of stationary mirrors is arranged about the axis. As the mirrored component turns, the laser beam is successively reflected onto the stationary mirrors for reflection therefrom through the scanner window as a scan pattern of the laser scan lines.

Other checkout systems are imager-based workstations, and have one or more solid-state imagers, or image sensors, analogous to those conventionally used in consumer digital cameras. Each imager has a one- or two-dimensional array of photocells or light sensors (also known as pixels), and an imaging lens assembly for capturing return light scattered and/or reflected from a target being imaged through a scanner window over a field of view, and for projecting the return light onto the sensor array to initiate capture of an image of the target over a range of working distances in which the target can be read. The target may be a symbol, as described above, either printed on a label or displayed on a display screen of an electronic device, such as a smart phone. The target may also be a form, such as a document, label, receipt, signature, driver's license, employee badge, or payment/loyalty card, etc., each bearing alphanumeric characters, as well as a picture, to be imaged. Such an imager may include a one- or two-dimensional charge coupled device (CCD) or a complementary metal oxide semiconductor (CMOS) device and associated circuits for producing and processing electrical signals corresponding to a one- or two-dimensional array of pixel data over the field of view. These electrical signals are decoded and/or processed by a programmed microprocessor or controller into data related to the target being electro-optically read, e.g., decoded data identifying the product and enabling information, such as the product's price, to be retrieved from a price database, or into a picture of a target other than a symbol.

Some laser-based workstations and imager-based workstations are provided with a scale for weighing products that are sold on the basis of weight. For example, many fruits, vegetables, meats, cheeses, nuts, fish, bakery items, candies, etc. are offered for sale in a quantity selected by the customer, and the total price of such loose products depends upon the total weight of the selected quantity. The workstation scale includes a weighing platter or platform, in which the above-mentioned horizontal window is typically integrated. The weighing platter has a generally planar upper surface and overlies a scale mechanism, e.g., one or more load cells. During checkout, the product is placed on the weighing platter so that the scale can measure the product weight. Once the product is identified by reading its target, its unit weight price is retrieved from a price database, and the total price is calculated based on the unit weight price and the weight measured by the scale.

However, as advantageous as the use of such scales in combination with a workstation has been, one concern relates to preventing certain weighing platters from tipping during weighing. Some weighing platters have a length (in practice, about nine inches) and a width that generally matches those of the underlying scale mechanism, and these platters are not subject to tipping. However, some retailers, e.g., warehouse clubs, want longer weighing platters, e.g., on the order of twelve inches, to accommodate weighing of their products, some of which are quite long, especially when purchased in bulk. Although these longer weighing platters have the same width as that of the underlying scale mechanisms, the longer weighing platters project past, and have front ends that overhang, the scale mechanisms in length in front of the user. If a product is placed on such an overhanging platter, especially on its front end, then there is a tendency for the longer weighing platter to tip, that is, for the front end of the longer weighing platter to tilt and descend downwardly. If the front end abuts against a stop, e.g., a part of a counter in which the workstation is installed, then the weight measurement will be erroneous, which is unacceptable. Such tipping can also occur if a user merely accidentally leans on the front end of the longer weighing platter.

It is known to try and resist such tipping by making the weighing platters very heavy, i.e., four or more pounds. However, this solution is ineffective against very heavy products, or accidental user leaning, or even lighter products that are dropped on the front end of the weighing platter. It is also known to make different scale mechanisms with different lengths and widths to accommodate those of the weighing platters. However, the scale mechanism is a complex device, and it is not cost effective to manufacture and supply different scale mechanisms of different sizes.

Another concern about the weighing platters relates to cleaning them. The checkout system environment can be quite dusty and dirty. Products successively placed on, and swiped past, the horizontal window on the weighing platter can shed pieces thereof, or can spill, and will therefore contaminate the weighing platter. Periodic, and frequent, cleaning of the weighing platter are therefore essential, especially in a food environment where hygiene and sanitary conditions are paramount.

It is known to remove weighing platters for cleaning by using tools. However, tools may not always be available. Tools also require a certain amount of skill. Certain retail store personnel may not have the requisite skills to handle tools and/or remove the weighing platters.

Accordingly, there is a need to prevent an overhanging weighing platter of a scale at a workstation from tipping during product weighing without requiring the weighing platter to be extra heavy and without requiring the manufacture and supply of different scale mechanisms of different sizes. There is also a need to easily and rapidly mount the weighing platter on, and to easily and rapidly remove the weighing platter from, the scale mechanism, without the aid of tools, for cleaning purposes.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to a checkout system including a workstation having a horizontal window located in a generally horizontal plane, and a data capture arrangement for capturing through the horizontal window a target associated with a product to identify the product being checked out at the workstation, and a scale for weighing the product at the workstation. The scale includes a scale mechanism, and a weighing platter on which the product is placed for weighing. The weighing platter is integrated with the horizontal window and overlies the scale mechanism. The weighing platter projects past the scale mechanism and has a front end that overhangs the scale mechanism. Non-threaded, interlocking connectors are provided on the weighing platter and the scale mechanism, for preventing the weighing platter from tipping if a force, such as a weight of the product, is exerted on the front end of the weighing platter.

Advantageously, the workstation is a bi-optical workstation that has another upright window located in a generally upright plane that intersects the generally horizontal plane. The data capture arrangement preferably includes at least one solid-state imager for capturing through at least one of the windows an image of the target, and a microprocessor operatively connected to the at least one imager for processing the image of the target. The workstation is typically seated in a well of a counter, and the scale includes a case having a flange mounted on a wall bounding the well. The front end of the weighing platter is elevated at a distance above the flange. In the prior art, if the weighing platter tips as a result of the product being placed on the front end of the weighing platter, or as a result of a user leaning on the front end, then the front end will travel through this distance until it abuts against the flange, thereby leading to an erroneous weight measurement. The above-described non-threaded, interlocking connectors prevent this travel in accordance with this disclosure.

In a preferred embodiment, the non-threaded, interlocking connectors include a pair of spaced-apart hooks depending downwardly from the weighing platter, a pair of spaced-apart slots in a frame of the scale mechanism, and a pair of spaced-apart catches on the frame for being lockingly engaged by the hooks after the hooks pass through the slots. The frame has a pair of spaced-apart alignment rear pegs on a rear of the frame, and a pair of spaced-apart alignment front pegs on a front of the frame. The weighing platter has a pair of spaced-apart rear pockets in a rear of the weighing platter for receiving the rear pegs during passage of the hooks through the slots, and a pair of spaced-apart front pockets in a front of the weighing platter for receiving the front pegs after the catches have been engaged by the hooks.

A checkout method, in accordance with another aspect of this disclosure, is performed by capturing through a horizontal window of a workstation a target associated with a product to identify the product being checked out at the workstation, weighing the product at the workstation by placing the product on a weighing platter integrated with the horizontal window, overlying a scale mechanism at the workstation with the weighing platter such that a front end of the weighing platter projects past, and overhangs, the scale mechanism, and preventing the weighing platter from tipping if a force is exerted on the front end of the weighing platter by interlocking non-threaded connectors provided on the weighing platter and the scale mechanism.

Another method of removably mounting a weighing platter on a scale mechanism for weighing a product to be checked out at a workstation, in accordance with still another aspect of this disclosure, is performed by receiving a pair of alignment rear pegs on a rear of a frame of the scale mechanism in a pair of rear pockets in a rear of the weighing platter, passing a pair of hooks on the weighing platter through a pair of slots in the frame during reception of the rear pegs in the rear pockets, lockingly engaging the hooks with a pair of catches on the frame after the hooks have passed through the slots, and receiving a pair of alignment front pegs on a front of the frame into a pair of front pockets in a front of the weighing platter after the catches have been engaged by the hooks.

Figure 1:
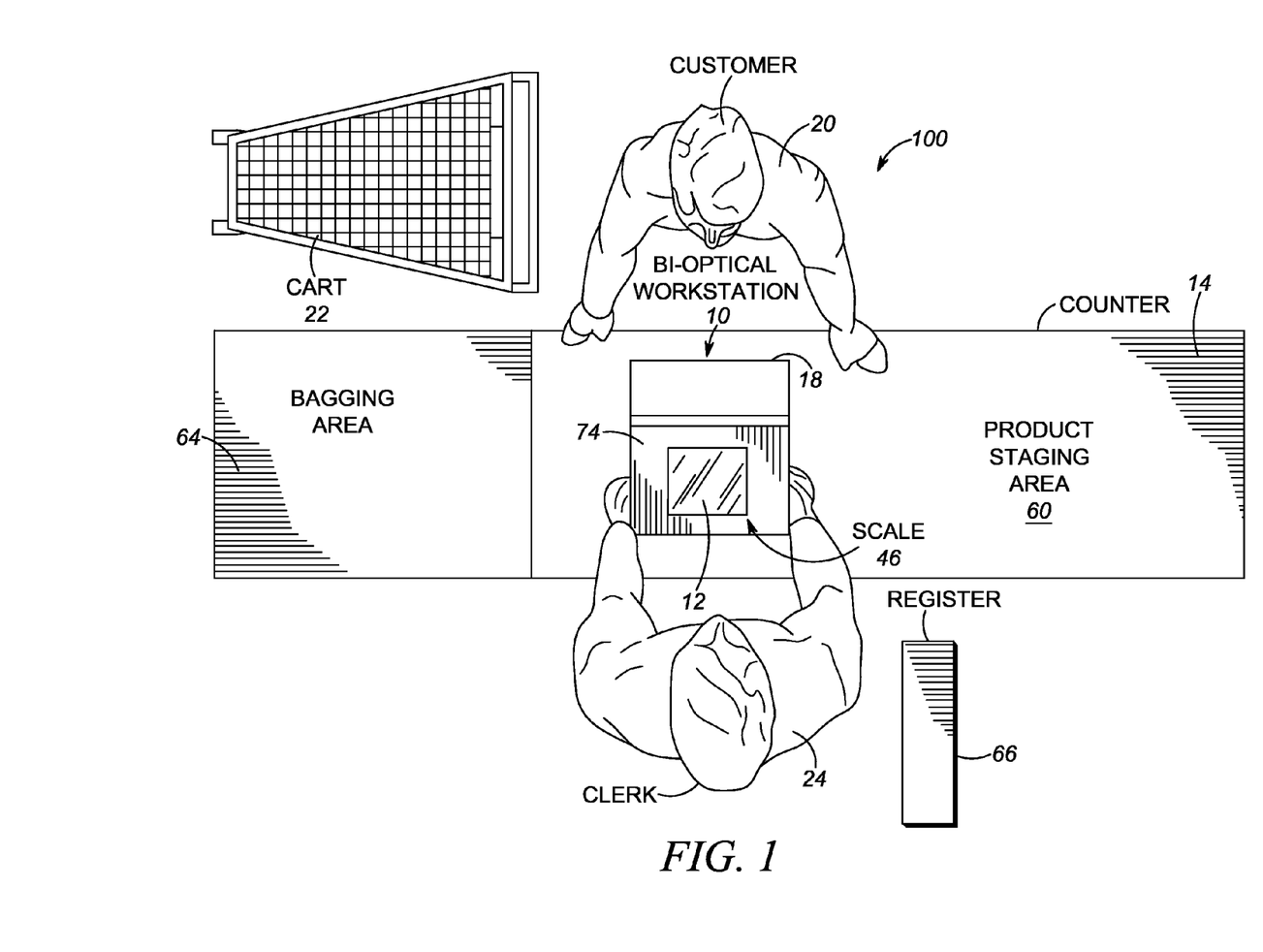
FIG. 1 is a top plan view of a checkout system for processing products associated with targets electro-optically readable at a workstation that has an integrated weighing scale in accordance with this disclosure.
Figure 2:
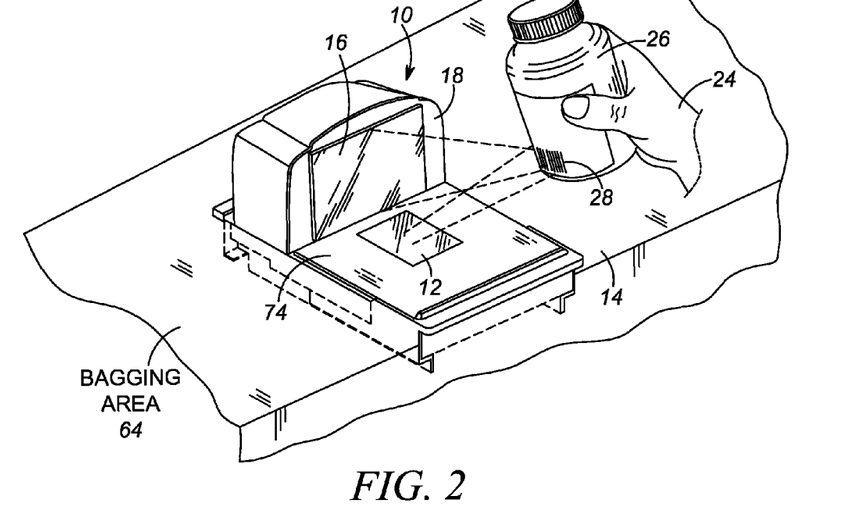
FIG. 2 is a broken-away perspective view of the system of FIG. 1 during reading.
Figure 3:
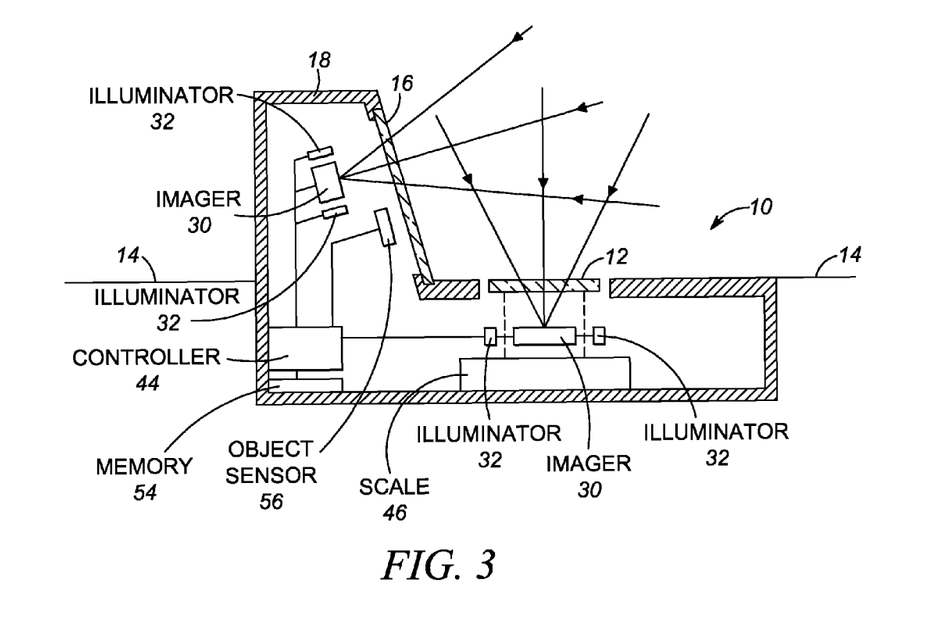
FIG. 3 is a schematic diagram of various components of the workstation of FIG. 1.
Figure 6:
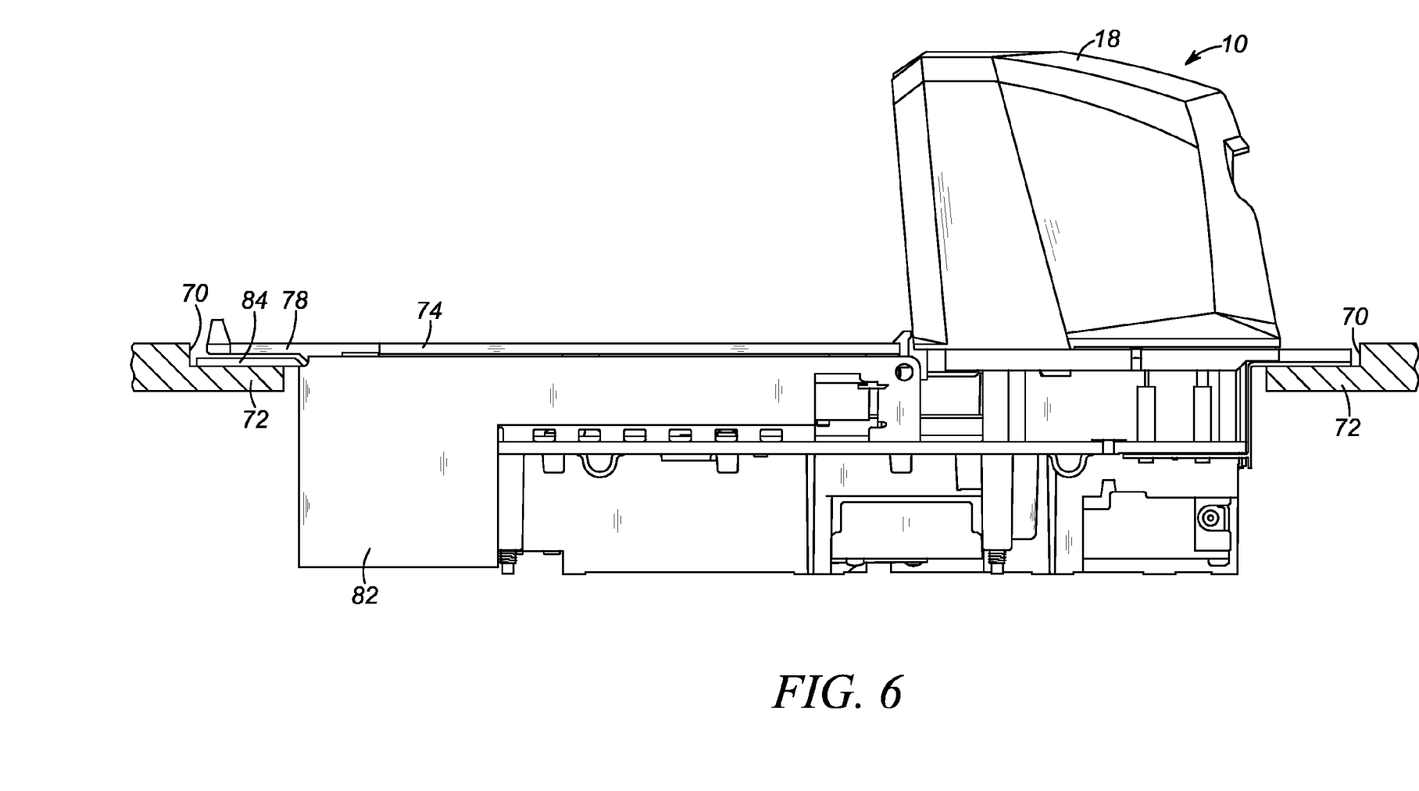
FIG. 6 is a view analogous to FIG. 5, but showing the workstation mounted in a well of a counter.

Turning now to the drawings, a checkout system 100, as depicted in FIG. 1, includes a dual window, bi-optical, point-of-transaction workstation 10 used by retailers at a checkout counter to process transactions involving the purchase of products 26 (see FIG. 2) bearing an identifying target, such as the UPC symbol 28 described above. As best seen in FIGS. 2-3, the workstation 10 has a generally horizontal planar window 12 elevated, or set flush with, a countertop 14, and a vertical or generally vertical, i.e., tilted, (referred to as "upright" hereinafter) planar window 16 set flush with, or recessed into, a raised housing portion 18 above the countertop 14. The workstation 10 either rests directly on the countertop 14, or preferably, as shown in FIG. 6, rests in a cutout or well 70 formed in the counter and bounded by ledges or walls 72.

Returning to FIG. 1, both of the windows 12, 16 are positioned to face and be accessible to a clerk 24 standing at one side of the counter for enabling the clerk 24 to interact with the workstation 10, and with a cash register 66 to enable the clerk to receive payment for the purchased products. The register 66 may include a debit/credit card reader and a receipt printer to print a receipt. A keypad may also be provided at the register 66 to enable manual entry of information, such as an identifying code for any purchased product not bearing a symbol, by the clerk 24.

A product staging area 60 is located on the countertop 14 at one side of the workstation 10. he products 26 are typically placed on the product staging area 60 by a customer 20 standing at the opposite side of the counter. The customer 20 typically retrieves the individual products for purchase from a shopping cart 22 or basket for placement on the product staging area 60. A non-illustrated conveyor belt could be employed for conveying the products 26 to the clerk 24.

As schematically shown in FIG. 3, a data capture arrangement, advantageously including a plurality of imaging readers, each including a solid-state imager 30 and an illuminator 32, is mounted at the workstation 10, for capturing light passing through either or both windows 12, 16 from a target that can be a one- or two-dimensional symbol, such as a two-dimensional symbol on a driver's license, or any document. Each imager 30 is a solid-state area array, preferably a CCD or CMOS array. Each imager 30 preferably has a global shutter. Each illuminator 32 is preferably one or more light sources, e.g., one or more surface-mounted, light emitting diodes (LEDs), located at each imager 30 to uniformly illuminate the target.

Figure 4:
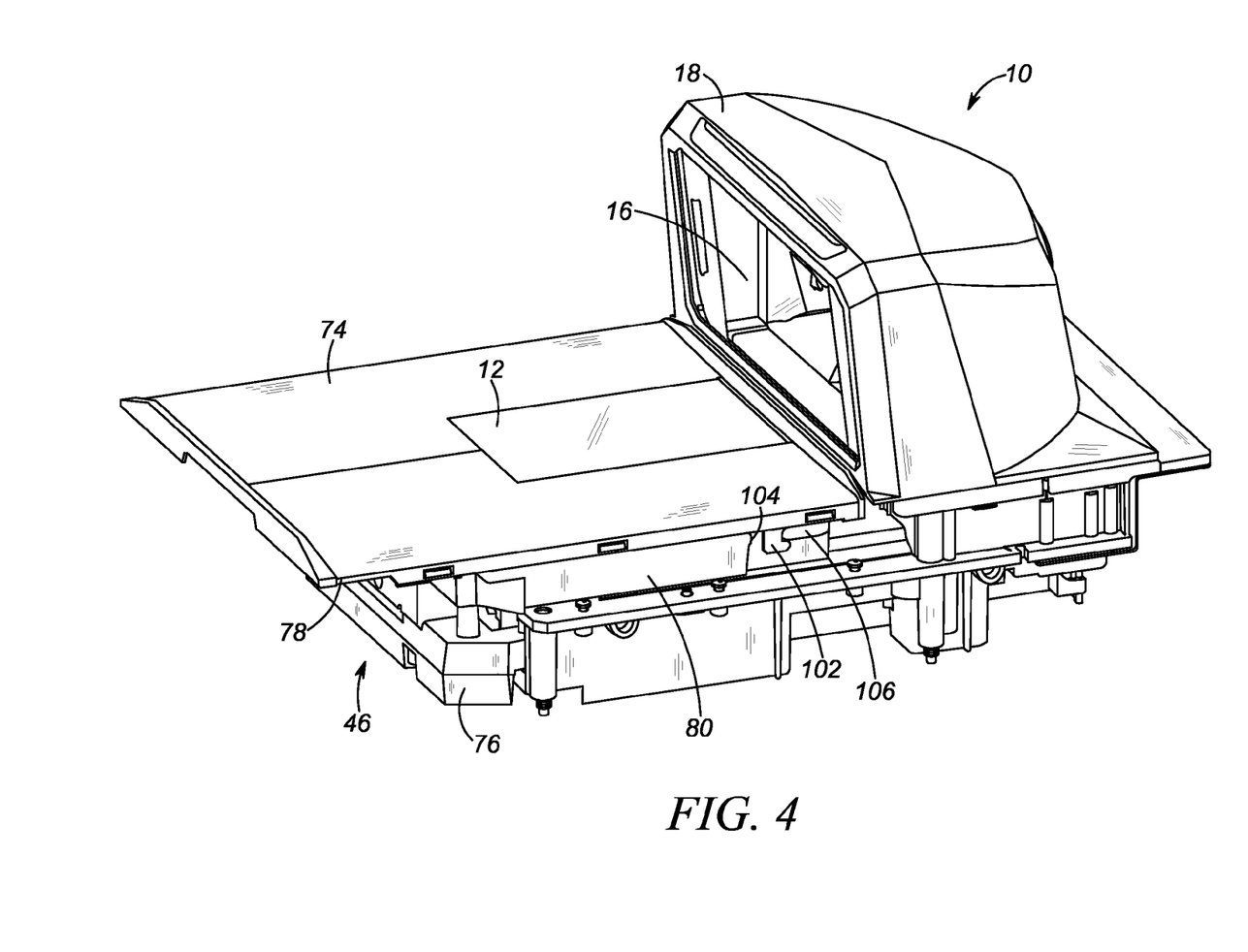
FIG. 4 is a perspective view of a practical embodiment of the workstation of FIGS. 1-3 in isolation.

In use, the clerk 24 processes each product 26 bearing a UPC symbol or target 28 thereon, past the windows 12, 16 by swiping the product 26 across a respective window, or by presenting the product 26 by holding it momentarily steady at the respective window, before passing the product 26 to a bagging area 64 that is located at the opposite side of the workstation 10. The target 28 may be located on any of the top, bottom, right, left, front and rear, sides of the product, and at least one, if not more, of the imagers 30 will capture the illumination light reflected, scattered, or otherwise returning from the target through one or both windows as an image. FIG. 3 also schematically depicts that a weighing scale 46 can be mounted at the workstation 10. As best shown in FIG. 4, and as further described in detail below, the weighing scale 46 has a weighing platform or platter 74 for supporting a product to be weighed. The generally horizontal window 12 is integrated with the weighing platter 74.

As schematically shown in FIG. 3, an object sensor 56 is also mounted at the workstation 10 for detecting when each product 26 enters and exits the workstation 10. The object sensor 56 may advantageously include two pairs of infrared (IR) light emitting diode (LED) emitters and IR detectors. Each IR emitter directs IR light, which is invisible to the human eye, in a wavelength range from about 700 nm to about 1100 nm, over a viewing angle through the workstation window at the target 28 for return therefrom for detection by the IR detector for detecting return IR light returned from the target 28 over an object detection field of view. The viewing angle of each emitter is approximately equal to the object detection field of view of the IR detector for better system efficiency and pointing in the direction of the target. The object detection field of view substantially overlaps the reading field of view. The object sensor 56 need not be IR-based, but could instead be any motion or proximity sensor.

The imagers 30, the associated illuminators 32, and the object sensor 56 are operatively connected to a programmed workstation microprocessor or controller 44 operative for controlling the operation of these and other components. Preferably, the microprocessor 44 is tasked with processing the return light scattered from each target 28, and with decoding the captured target image of the return light. A memory 54 is operatively bidirectionally connected to the microprocessor 44.

In operation, an active mode for the microprocessor 44 is initiated when the object sensor 56 detects that a product 26 has entered the workstation 10. The microprocessor 44 then sends successive command signals to the illuminators 32 to pulse the LEDs for a short time period of 300 microseconds or less, and successively energizes the imagers 30 to collect light from the target 28 only during said time period, also known as the exposure time period. By acquiring a target image during this brief time period, the image of the target 28 is not excessively blurred even in the presence of relative motion between the imagers and the target. A typical array needs about 11 to 33 milliseconds to acquire the entire target image and operates at a frame rate of about 30 to 90 frames per second. The array may have on the order of one million addressable sensors. The active mode ends when the object sensor 56 detects that the product 26 has exited the workstation 10, or when the microprocessor 44 has successfully decoded the target 28 and identified the product 26.

Figure 5:
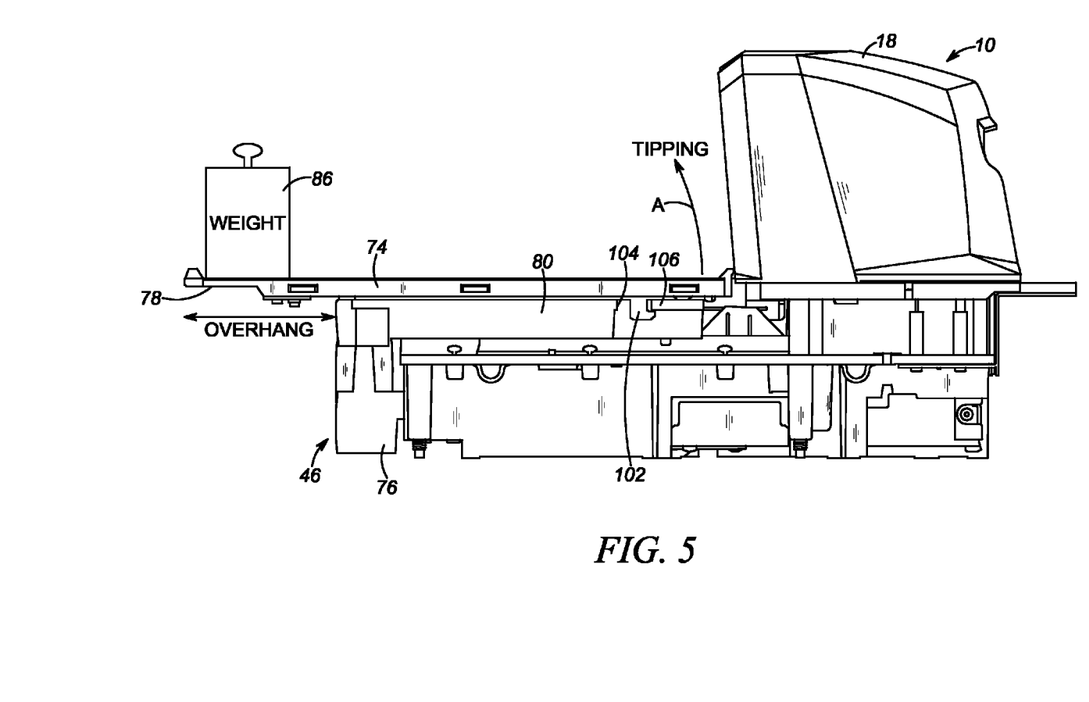
FIG. 5 is a side view of the isolated workstation of FIG. 4, depicting a tipping problem which the present disclosure seeks to overcome.

As shown in a practical embodiment depicted in FIG. 4, the scale 46 includes the aforementioned weighing platter 74 having a generally planar upper surface on which a product is placed for weighing, and a scale mechanism 76, e.g., one or more load cells, underneath the weighing platter 74. The scale mechanism 76 has a top frame 80 positioned directly underneath the weighing platter 74. The horizontal window 12 is flush-mounted with the weighing platter 74, which overlies the scale mechanism 76 and the frame 80. As shown in FIG. 5, the weighing platter 76 projects past the scale mechanism 76 and has a front end 78 that overhangs the scale mechanism 76.

As shown in FIG. 6, the scale 46 has a protective case 82, preferably constituted of sheet metal, and enclosing the scale mechanism 76. The case 82 has a flange 84 mounted on the ledge or wall 72 bounding the well 70 in the counter. In FIG. 5, the case 82 and the flange 84 were removed for clarity. The front end 78 of the weighing platter 74 is elevated at a distance above the flange 84. In the prior art, if the overhanging weighing platter 74 tips, e.g., in the direction of the arrow "A" in FIG. 5, as a result of a force, e.g., a weight of a product being placed on the front end 78 of the weighing platter 74, or as a result of a user leaning on the front end 78 (this force being schematically represented in FIG. 5 by a weight 86), then the front end 78 will travel through this distance until it abuts against the flange 84, thereby leading to an erroneous weight measurement. One aspect of this disclosure is to prevent this travel.

To that end, non-threaded, interlocking connectors are provided on the weighing platter 74 and the scale mechanism 76. In a preferred embodiment, the non-threaded, interlocking connectors include a pair of spaced-apart, generally L-shaped, hooks 102 depending downwardly from opposite sides of the weighing platter 74, a pair of spaced-apart slots 104 in the frame 80 and located at opposite sides thereof, and a pair of spaced-apart catches 106 on the frame 80 and located at, and projecting past, opposite sides thereof. As described below in connection with FIGS. 7A, 7B, 7C and 7D, the catches 106 are lockingly engaged by the hooks 102 after the hooks 102 pass through the slots 104. This locking engagement, as for example shown in FIG. 5, prevents the weighing platter 74 from tipping.

As best seen in FIGS. 8A, 8B, 8C and 8D, the frame 80 has a pair of spaced-apart, upright alignment rear pegs 108 on a rear of the frame 80, and a pair of spaced-apart, upright alignment front pegs 110 on a front of the frame 80. The underside of the weighing platter 74 has a pair of spaced-apart rear pockets 112 in a rear of the weighing platter 74 for receiving the rear pegs 108, and a pair of spaced-apart front pockets 114 in a front of the weighing platter 74 for receiving the front pegs 110 after the catches 106 have been engaged by the hooks 102, as described below.

Figure 7A:
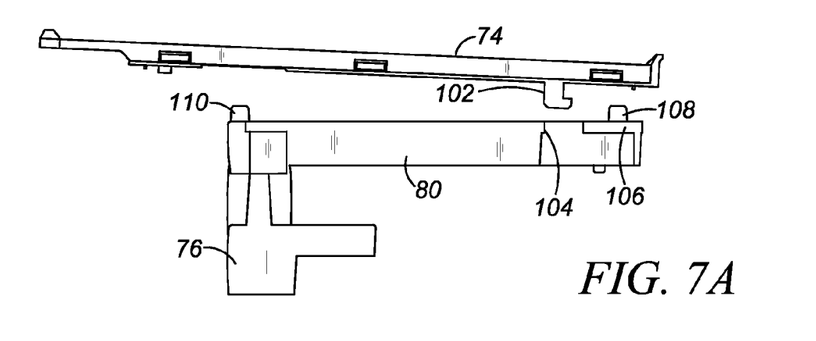
FIGS. 7A, 7B, 7C and 7D are successive side views depicting how a weighing platter is mounted on a scale mechanism of the scale in sequence.
Figure 7B:
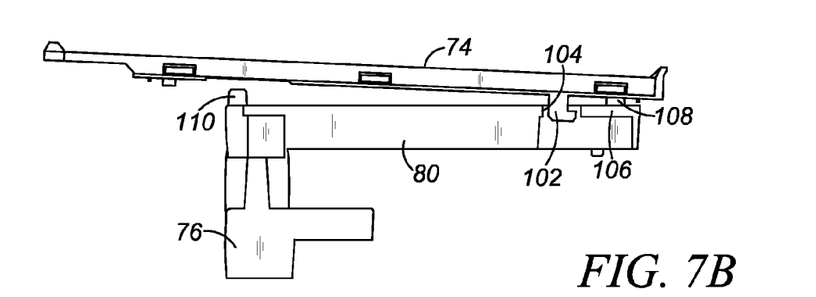
Figure 7C:
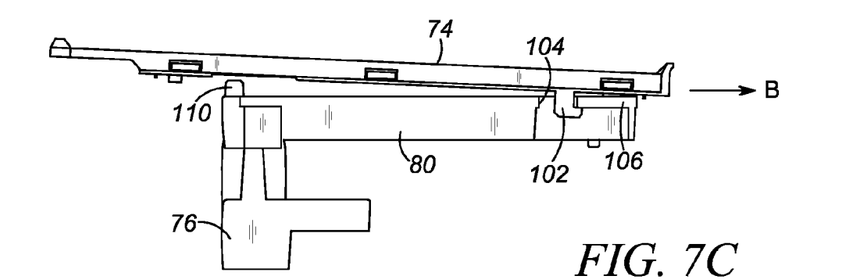
Figure 7D:
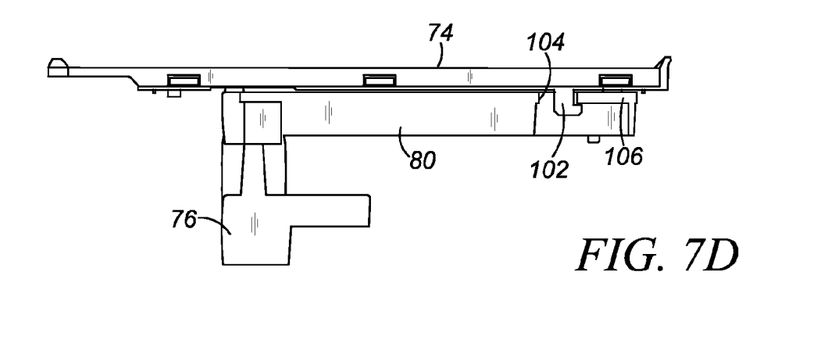
Figure 8A:
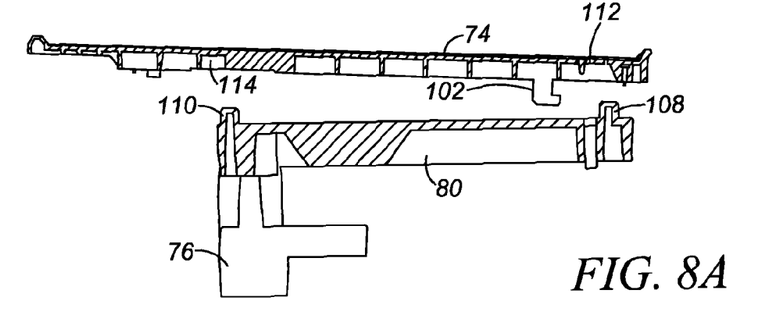
FIGS. 8A, 8B, 8C and 8D are successive cross-sectional views depicting how the weighing platter is mounted on the scale mechanism of the scale in sequence.
Figure 8B:
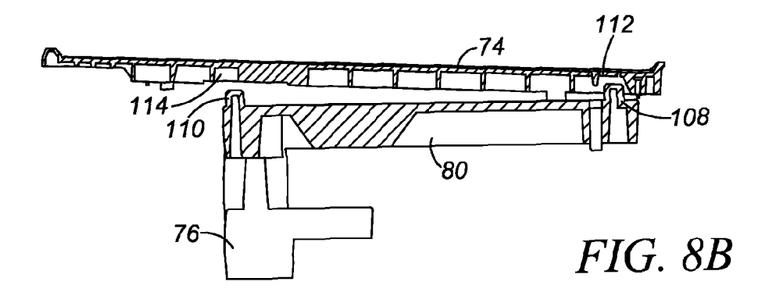
Figure 8C:
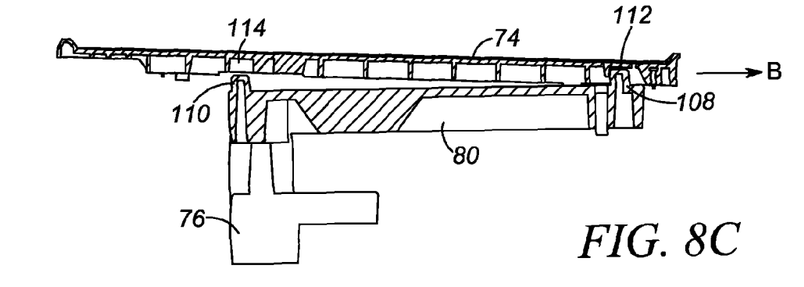
Figure 8D:
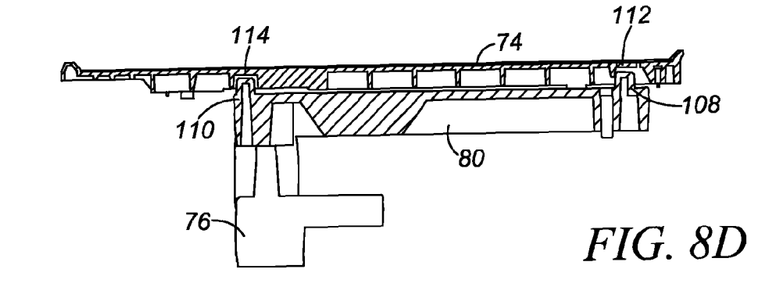

Thus, FIGS. 7A, 7B, 7C and 7D in side view, and FIGS. 8A, 8B, 8C and 8D in cross-sectional view, depict the sequence by which the weighing platter 74 is mounted on the frame 80. In FIGS. 7A, 8A, the hooks 102 are vertically aligned with the slots 104. Then, in FIGS. 7B, 8B, the rear of the weighing platter 74 is vertically lowered and, concomitantly, the rear pegs 108 are received in the rear pockets 112, and the hooks 102 are passed through the slots 104. Next, in FIGS. 7C, 8C, the weighing platter 74 is moved or slid toward the raised housing portion 18 in the direction of the arrow "B". The rear pockets 112 are oversized to permit this sliding movement. This sliding movement causes the hooks 102 to hook onto, and lockingly engage, the catches 106. Next, the front of the weighing platter 74 is vertically lowered and, concomitantly, the front pegs 110 are received in the front pockets 114. By reversing this sequence, the weighing platter 74 is removed from the frame 80. No tools have been utilized during mounting and removal.

Figure 9:
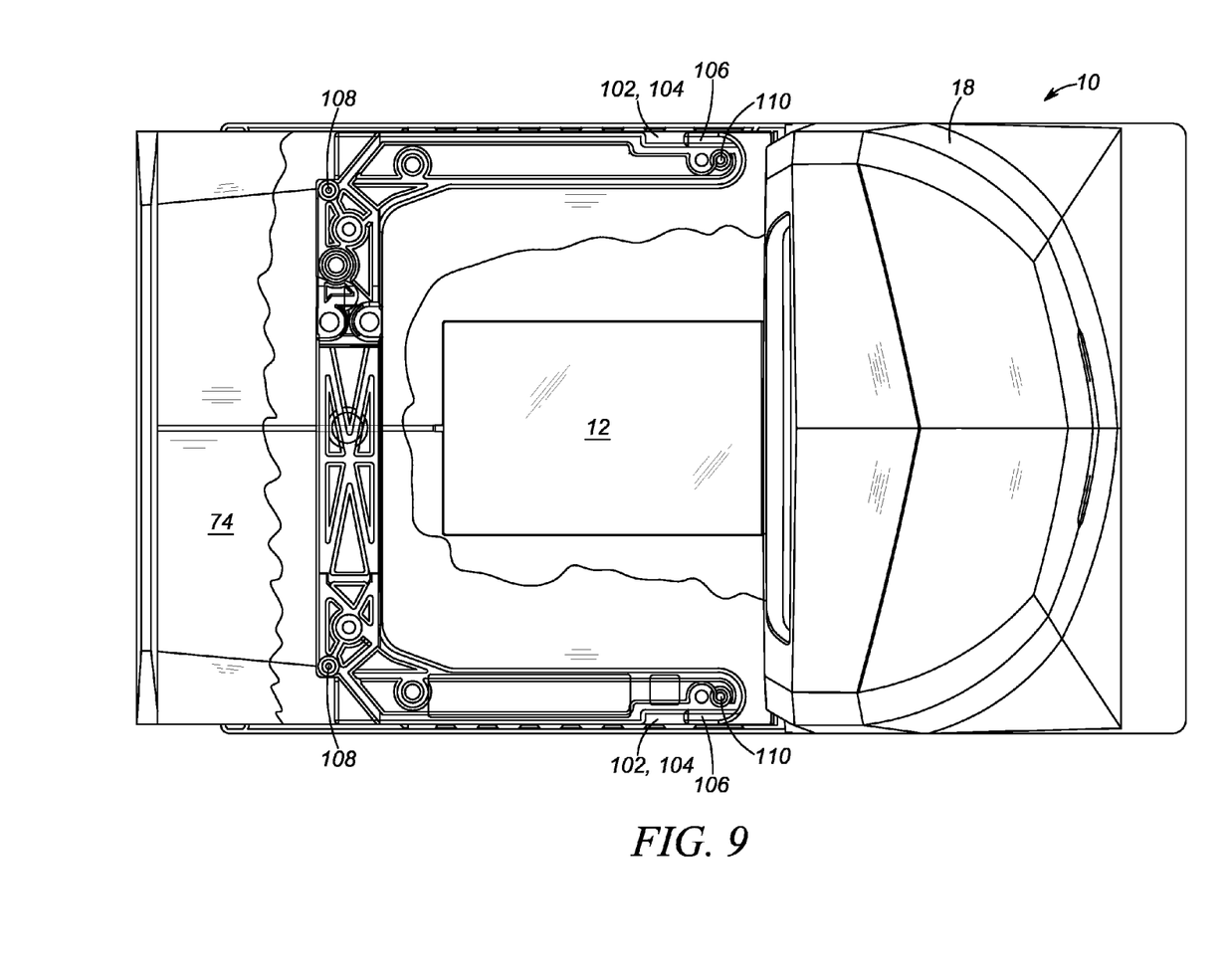
FIG. 9 is a top plan view of the isolated workstation of FIG. 4.

FIG. 9 depicts the locations of the various interlocking connectors from above.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

For example, the workstation 10 need not be configured as a bi-optical workstation, but could instead be configured as a flat bed or horizontal slot scanner having a single horizontal window. The workstation 10 need not be imager-based, but could instead be laser-based. An imager-based workstation need not have the configuration depicted in FIG. 3, but instead could have one or more imagers, each having a field of view split by optical splitters and by a plurality of fold mirrors into a plurality of subfields for greater coverage.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A checkout system, comprising:
a workstation having a horizontal window located in a generally horizontal plane, and a data capture arrangement for capturing through the horizontal window a target associated with a product; and
a scale including:
a scale mechanism including a load cell and a frame,
a weighing platter on which the product is placed for weighing, the weighing platter being integrated with the horizontal window and overlying the scale mechanism, the weighing platter projecting past the scale mechanism and having a front end that overhangs the scale mechanism, and
a connector arrangement on the weighing platter and the scale mechanism, the connector arrangement including non-threaded interlocking connector members configured to interlock and thereby secure the weighing platter to the scale mechanism such that the rear end of the weighing platter is prevented from moving up vertically when a downward force is exerted on the front end of the weighing platter.

2. The system of claim 1, wherein:
the workstation has an upright window located in a generally upright plane that intersects the generally horizontal plane; and
the data capture arrangement includes at least one solid-state imager for capturing through at least one of the windows an image of the target, and
further comprising a microprocessor operatively connected to the at least one imager for processing the image of the target.

3. The system of claim 1, wherein:
the workstation is seated in a well of a counter;
the scale includes a case outside the frame;
the case has a flange mounted on a wall bounding the well; and
the front end of the weighing platter is elevated at a distance above the flange.

4. The system of claim 1, wherein the load cell is in force-transmitting relationship with the weighing platter.

5. A method, comprising:
configuring an imager to capture through a horizontal window of a workstation a target associated with a product to identify the product being checked out at the workstation;
integrating a weighing platter with the horizontal window;
overlying a scale mechanism having a load cell and a frame at the workstation with the weighing platter such that a front end of the weighing platter projects past, and overhangs, the scale mechanism;
providing a connector arrangement on the weighing platter and the scale mechanism, the connector arrangement including non-threaded interlocking connector members; and
interlocking the non-threaded interlocking connector members and thereby securing the weighing platter to the scale mechanism such that the rear end of the weighing platter is prevented from moving up vertically when a force is exerted on the front end of the weighing platter.

6. The method of claim 5, further comprising configuring the workstation with an upright window located in a generally upright plane that intersects the generally horizontal plane to capture an image of the target.

7. The method of claim 5, further comprising:
seating the workstation in a well of a counter;
mounting a flange of a case of the scale on a wall bounding the well; and
elevating the front end of the weighing platter at a distance above the flange.

* * * * *